United States Patent [19]

Meyn

[11] Patent Number: 5,125,498
[45] Date of Patent: Jun. 30, 1992

[54] APPARATUS FOR TRANSFERRING OBJECTS FROM A FIRST CONVEYOR TOWARDS A SECOND CONVEYOR

[75] Inventor: Cornelis Meyn, Oostzaan, Netherlands

[73] Assignee: Machinenfabriek Meyn B.V., Netherlands

[21] Appl. No.: 501,593

[22] Filed: Mar. 29, 1990

[30] Foreign Application Priority Data

Apr. 7, 1989 [NL] Netherlands ............... 8900870

[51] Int. Cl.⁵ .............................................. B65G 29/00
[52] U.S. Cl. ............................. 198/465.4; 198/476.1; 452/182
[58] Field of Search ............ 198/465.4, 476.1; 452/182

[56] References Cited

U.S. PATENT DOCUMENTS

| | | | |
|---|---|---|---|
| 3,710,711 | 1/1973 | Boehm et al. | 198/465.4 X |
| 4,570,295 | 2/1986 | van Mil | 452/182 |
| 4,574,428 | 3/1986 | Meyn | 452/182 |
| 4,597,133 | 7/1986 | van de Nieuwelaar | 452/182 |
| 4,660,256 | 4/1987 | Innes et al. | 452/182 X |
| 4,675,943 | 6/1987 | Tabata | 452/182 X |
| 4,709,448 | 12/1987 | McGuire et al. | 452/182 X |

FOREIGN PATENT DOCUMENTS 8805416 7/1988 PCT Int'l Appl. ............. 198/476.1

*Primary Examiner*—Robert P. Olszewski
*Assistant Examiner*—Cheryl L. Gastineau
*Attorney, Agent, or Firm*—Dority & Manning

[57] ABSTRACT

An apparatus for transferring objects from a first conveyor to a second conveyor which comprises a rotating carousel with a transferring devices regularly spaced about its circumference. The transferring devices are selectively activatable for transferring objects from one conveyor to the other conveyor. Preferably the transferring devices move up and down, for example, through a stationary curved track cooperating therewith.

18 Claims, 3 Drawing Sheets

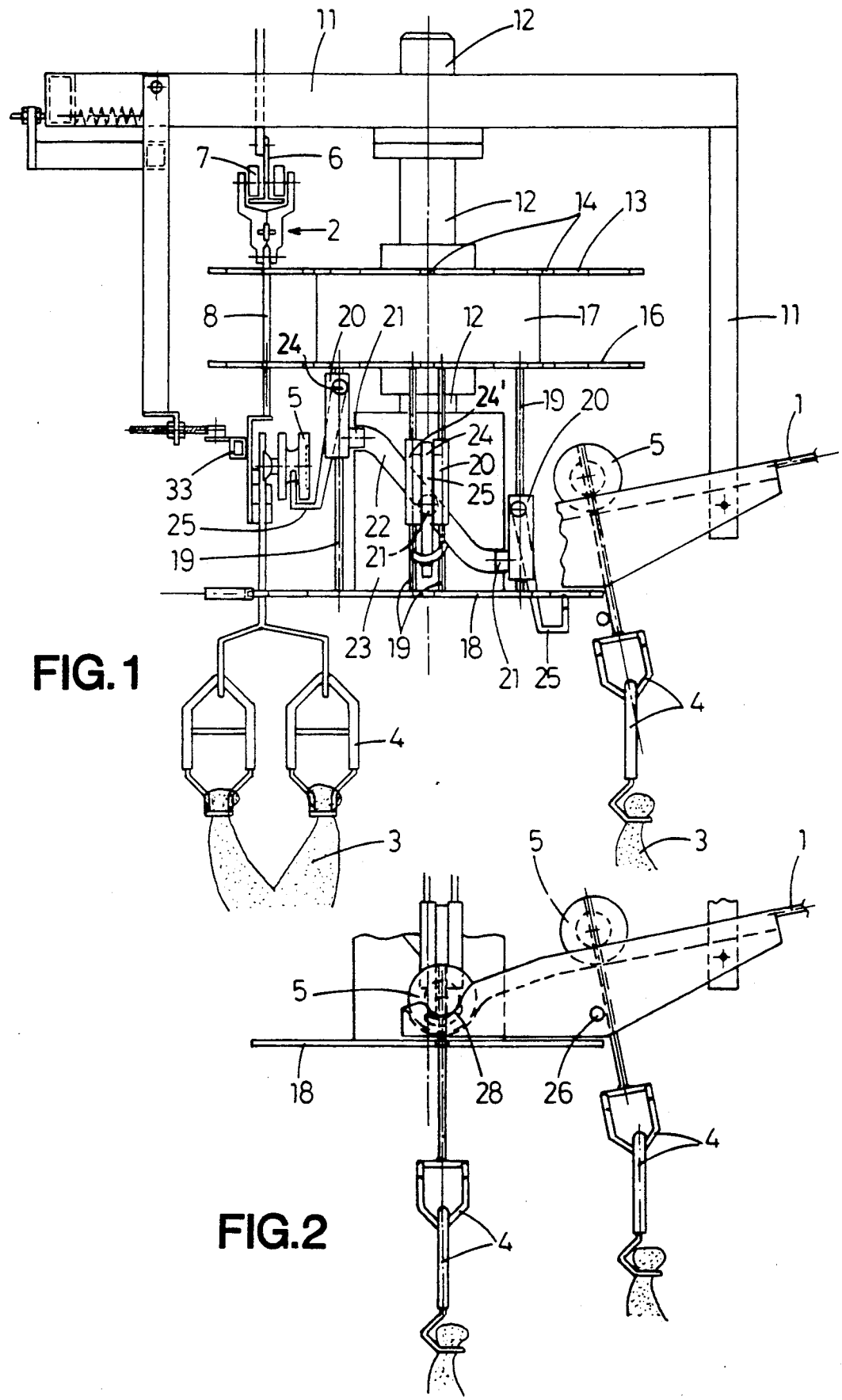

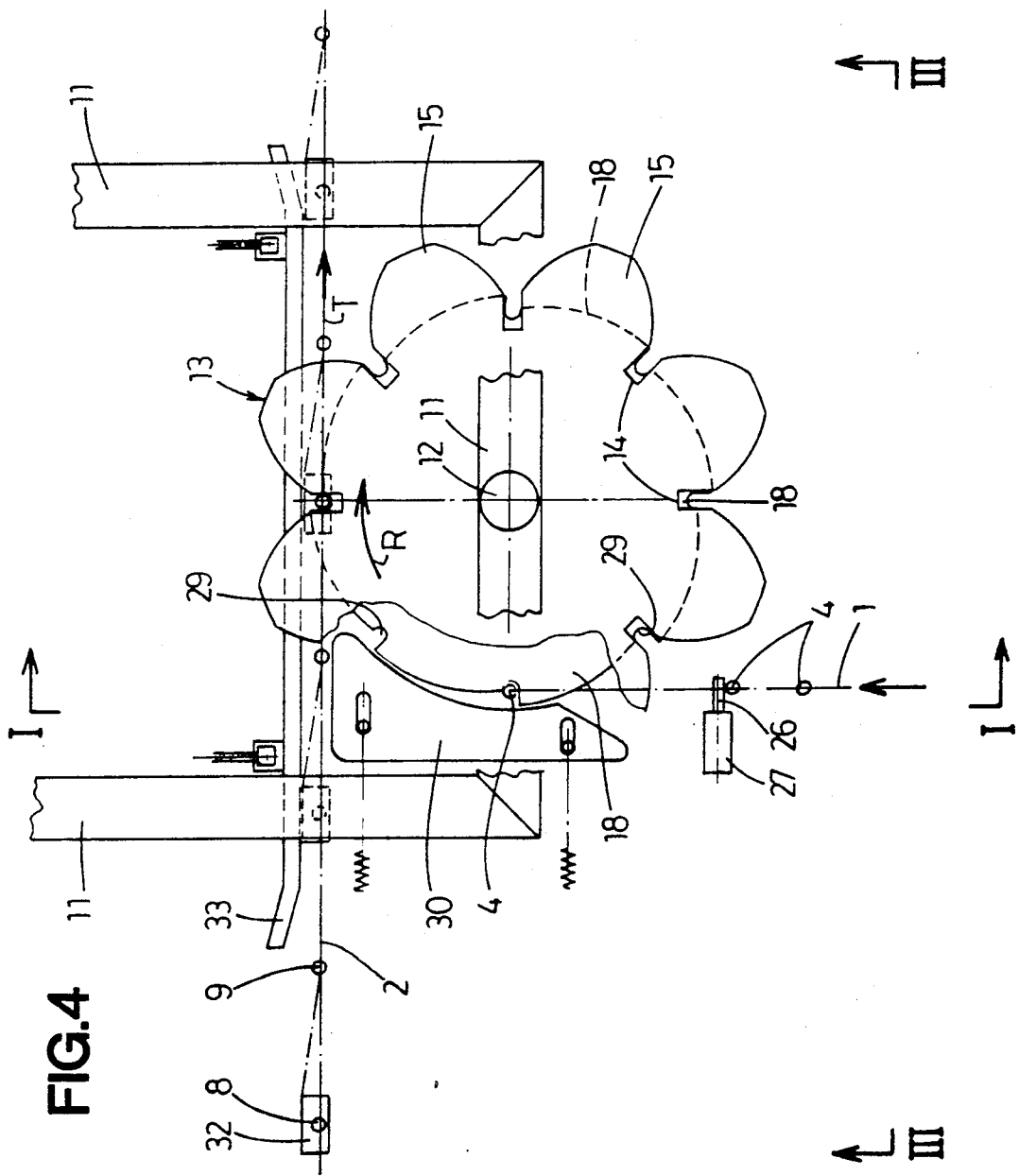

APPARATUS FOR TRANSFERRING OBJECTS FROM A FIRST CONVEYOR TOWARDS A SECOND CONVEYOR

BACKGROUND OF THE INVENTION

The invention relates to an apparatus for transferring objects from a first conveyor to a second conveyor.

Such an apparatus is used especially in the meat processing industry, such as when producing food products from poultry. In this context, it can be required that objects for example the poultry, is transferred to a special processing station.

SUMMARY OF THE INVENTION

It is an object of the invention to provide an apparatus of the type referred to above which combines a simple construction with an effective function.

To achieve this object the apparatus, according to the invention, is characterized by a rotating carousel with transferring means regularly spaced about its circumference, the followed circular trajectory of which is substantially tangent to the trajectory of both conveyors and which are selectively activatable for receiving objects from the fist conveyor and for positioning these on the second conveyor.

At the tangent point between the circular trajectory followed by the transferring means, and the trajectory of the first conveyor and the second conveyor receiving objects from the first conveyor, and positioning these objects on the second conveyor can take place in a proper way. The apparatus according to the invention may be positioned at any desired position of a first and second, respectively, conveyor, as long as account has been taken of the circular trajectory of the transferring means being tangent to the trajectory of these conveyors.

According to a preferred embodiment of the invention, the transferring means is movable up and down for lifting the objects out of the first conveyor and lowering them into the second conveyor.

The motion of the transferring means in one direction leads to the lifting of objects out of one of the conveyors, whereas the motion of the transferring means in the opposite direction provides for lowering the objects into the other conveyor. The mentioned motions hereby occur at the tangent point between the circular trajectory followed by the transferring means and the trajectories of the conveyors.

The up and down movement of the transferring means is obtained in a constructive simple way if the carousel is provided with a central stationary curved track whereas the transferring means is provided with follower rolls following this curved track and causing the up and down movement. The up and down movement of the transferring means can be easily changed by applying a differently shaped curved track. As a result the apparatus is extremely versatile.

Further, it is handy if according to an embodiment of the invention, the transferring means are provided with carrying means adapted to engage the objects and to be pivoted in and out in the radial direction of the carousel. Thus, it is possible to not transfer all objects from the one conveyor to the other but to have the possibility to decide at each object whether or not it should be transferred. Such a decision can, for example, be dependent on a previously registered weight of the object or the like.

Moreover, it can be of advantage if the carrying means are spring-loaded towards the outwardly pivoted position. In such a configuration the carrying means have the possibility to pivot inwardly if an attempt is made to offer an object to a location of the second conveyor at which an object is already present. Thereafter, the object carried by the respective carrying means could be removed in any appropriate way.

To obtain the afore-mentioned possibility to choose whether or not an object should be transferred from the first conveyor to the second conveyor it is advantageous if the carrying means are adapted to be selectively pivoted in and out through operating means. It is possible to use cylinder-piston assemblies which can move the carrying means towards the inwardly or outwardly pivoted position.

The up and down movement of the carrying means is realized in any easy way if these transferring means are mounted on slides which are movable up and down along guide bars. These slides may be provided with follower rolls engaging the curved track.

In another embodiment of the invention the carousel is driven by one of the conveyors. Driving the carousel in this way guarantees that the transferring means at the location of the tangent point between their followed circular trajectory and the trajectory of the respective conveyor have the same velocity as this conveyor. As a result, removing objects from or positioning objects on this conveyor occurs in an extremely effective way.

It is possible, that at least one of the conveyors comprises a suspension conveyor with suspension shackles, known per se. In such a case the objects are positionable in these suspension shackles and are removable therefrom, respectively. Further, it is possible that at least one of the conveyors comprises a rail, wherein the objects are, at their upper side, provided with a wheel which can roll along the rail. In combination, an embodiment is provided in which the objects, comprising a wheel, are supplied along the conveyor comprising a rail, and are lifted from this rail by the transferring means and are next positioned into the suspension shackles of an other conveyor which is shaped as a suspension conveyor. The reverse is possible too.

If the apparatus is applied to a conveyor comprising a rail it is preferred that along side the rail, selectively activatable abutments means are positioned for temporarily keeping the objects out of engagement with the transferring means.

In this way, it is also possible to determine at which moment an object is transferred to the other conveyor by a transferring means. For example, such abutment means are necessary if the conveyor to which objects have to be transferred, already contains a number of objects so that the objects to be transferred can only be positioned at some locations of this conveyor.

BRIEF DESCRIPTION OF THE INVENTION

Hereinafter, the invention will be elucidated by means of the drawing in which an embodiment of the apparatus according to the invention is illustrated.

FIGS. 1 shows schematically a side elevational view of an embodiment of the apparatus according to the invention according to the line I—I in FIG. 4;

FIG. 2 shows a detail of the apparatus from FIG. 1;

FIG. 4 shows schematically a top view of the apparatus represented in FIG. 1.

DETAILED DESCRIPTION OF THE INVENTION

Figure 3:
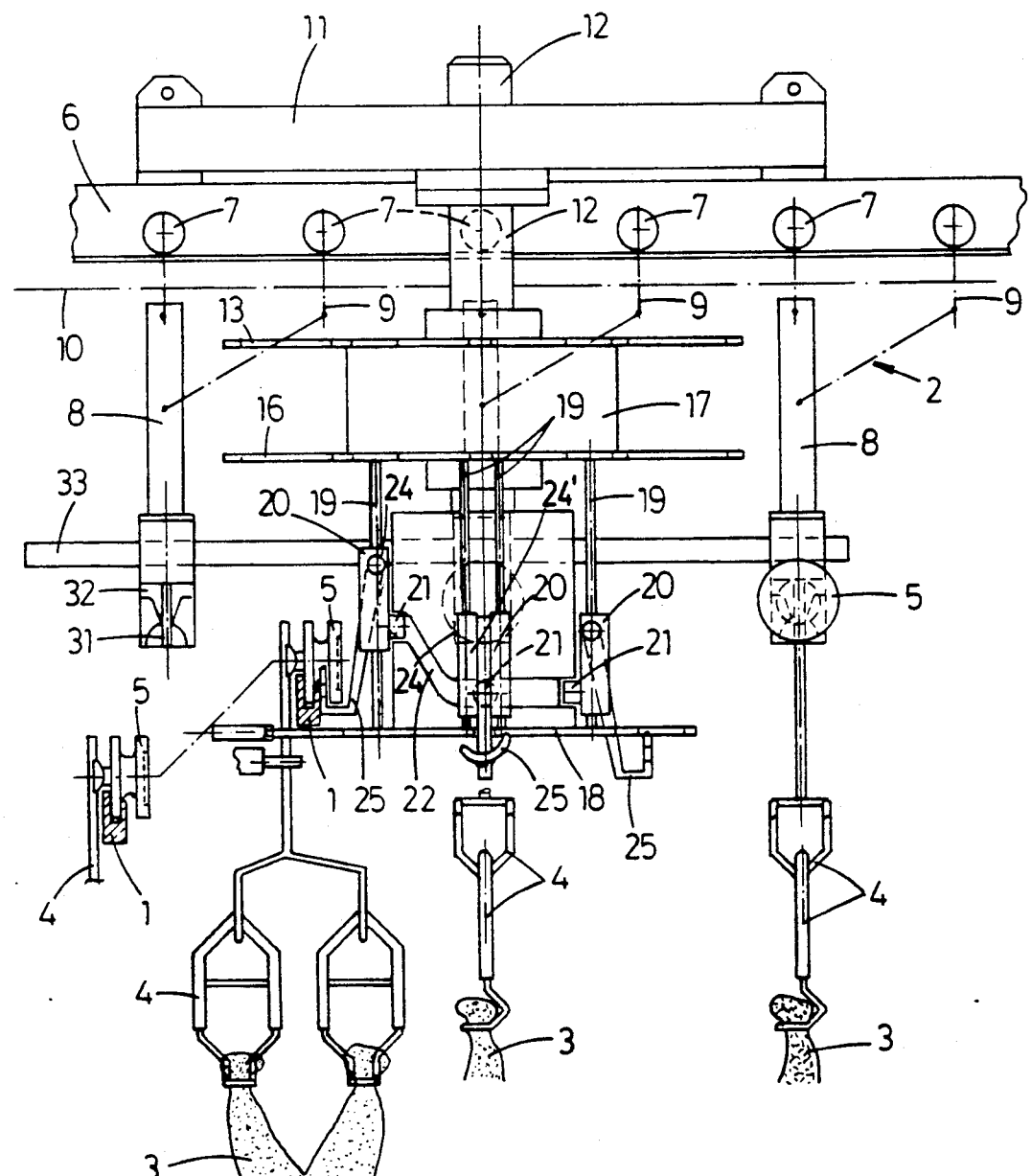
FIG. 3 shows a different side elevational view of the apparatus represented in FIG. 1 according to line III—III in FIG. 4.

The apparatus represented in the drawings is adapted for transferring objects from a first conveyor 1 towards a second conveyor 2. In the illustrated embodiment a first conveyor 1 comprises a rail, whereas the second conveyor 2 comprises a suspension conveyor know per se.

In the illustrated embodiment the objects to be transferred comprise poultry that, in a way known per se, is suspended in suspension shackles 4. At their upper side these suspension shackles 4 are provided with a wheel 5 having a shape that is adapted to the rail 1 of the first conveyor. In this way the suspension shackles 4 can, with their corresponding wheels 5, roll along rail 1 which, for this goal, is inclined.

In a way known per se, the suspension conveyor 2 comprises running wheels 7 supported by a support rail 6, which running wheels 7 alternatively carry upper suspension elements 8 and stabilization elements 9. The cooperation between the running wheels 7, the suspension elements 8 and the stabilization elements 9 (which have been indicated only schematically in FIG. 3 by means of dashed and dotted lines) is known per se and will not be elucidated further here. The consecutive suspension elements 8 are mutually connected by means of a motion chain 10 which in FIG. 3 is represented by a dashed and dotted line.

The support rail 6 is mounted in a frame 11 that in a way not shown further may be connected to a ceiling or that, by means of legs, can be supported on the floor. As will appear hereinafter frame 11 also constitutes the support construction for the apparatus itself.

A vertical shaft 12 is mounted in the frame 11. The apparatus for transferring objects is carousel-like rotatably mounted on and around this vertical shaft 12. This apparatus comprises first a drive wheel 13 that has regularly spaced about its circumference, recesses 14. The recesses 14 are meant to receive the suspension elements 8 and the stabilization elements 9 of the suspension conveyor 2. Thus, one will realize that the circumferential distance between two successive recesses 14 equals the distance between a suspension element 8 and a following or preceding stabilization element 9. As appears clearly from the top view according to FIG. 4, the drive wheel 13 comprises between each two adjacently positioned recesses 14 outwardly tapering projections 15. Projections 15 have a guide function such that the suspension elements 8 and the stabilization element 9 are properly received in the recesses 14.

The drive wheel 13 is driven by the suspension conveyor 2. As a result, the apparatus for transferring the objects is rotated in the direction of rotation R synchronously with the advancement of the suspension conveyor (corresponding with the conveying direction T illustrated in FIG. 4).

Slightly distanced below the drive wheel 13 is a stabilization wheel 16 which mainly may have the same shape as the drive wheel 13. Stabilization wheel 16 is meant for the stabilization of the suspension elements 8, such that these cannot carry out uncontrolled pivotal movements when objects are positioned therein. The stabilization wheel 16 is rigidly connected to the drive wheel 13 by means of a sleeve 17 so that the rotational velocities of both wheels are equal.

The lower end of the apparatus comprises a carrier wheel 18 that, through pairs of guide rods 19, is rotationally rigidly connected to the stabilization wheel 16. Guiding rods 19, which are regularly spaced along the circumference of the stabilization wheel 16 and the carrier wheel 18, respectively, support slides 20 which are movable up and down therealong. Each slide 20 is provided with a follower roll 21 which engages a curved track 22 on a curved cylinder 23, mounted stationary on the shaft 12. The curved cylinder 23 is stationary mounted on the shaft 12 and the slides 20, provided with follower rolls 21, together with the stabilization wheel 16 and the carrier wheel 18, rotate relative to shaft 12. The curved track 22 will cause a defined up and down movement of the slides 20 along the guiding rods 19 when the apparatus rotates.

In the illustrated embodiment, each slide 20 comprises two parts, each of which are positioned on a guiding rod 19 belonging to one pair. The two parts of each slide 20 are mutually connected by a horizontal shaft 24 (see FIG. 1) about which a carrying means 25 can pivot.

The lower end of the carrying means 25 has a shape adapted to the shape of the wheels 5 of the suspension shackles 4. Thus, carrying means 25 are adapted to engage wheels 5 at the lower side. Further, the carrying means 25 are spring loaded by means of a spring 24' to be pivoted outwardly about their respective shaft 24 relative to the control shaft 12 of the apparatus. By means of example, FIG. 3 shows at the right hand side the extreme outwardly pivoted position of the carrying means 25.

As appears clearly from the Figures the lower end of the carrying means 25 is, in the lowermost position of the slide 20, below the level of the carrier wheel 18. Therefore, carrier wheel 18 is provided with recesses, not represented in the drawing, through which the carrying means 25 may pass.

The operation of the apparatus is as follows.

An object to be transferred rolls downwards with its wheel 5 along the rail 1 of the first conveyor until the suspension shackle 4 abuts an abutment means 26. By means of an operating mechanism 27, abutment means 26 can be disengaged from the suspension shackle 4 so that this suspension shackle can move further downwards along the rail 1. As long as the abutment means 26 is positioned across the trajectory of the suspension shackle 4 the object can not move further downwards and stays out of the reach of the carrying means 25 of the transferring apparatus. Of course, it is possible that a number of objects are positioned behind the abutment means 26 with their wheels 5 contacting each other. Removing the abutment means 26 then occurs in such a way that only one object can pass the abutment means 26 at a time. Thus, the rail 1 operates as a buffer.

An object which has been released by the abutment means 26 finally comes to a standstill in a recess 28 of the rail 1. This position is not only represented in FIG. 2 but also in FIG. 3, in which (for the sake of clearness) rail 1 has been illustrated in cross section. At the location of a wheel 5 of an object waiting in the recess 28 a slide 20 moves upwards through the cooperation between the follower roll 21 connected thereto and the curved track 22 of the curved cylinder 23. Thus, the hook-shaped lower end of the respective carrying means 25 engages the wheel 5 which then is lifted out of the recess 28 of the rail 1.

At the same moment in which the carrying means 25 lifts the wheel 5, the carrier wheel 18 engages the suspension shackle 4 of the respective object. To Achieve this the carrier wheel 18 comprises, as appears clearly from FIG. 4, carrier recesses 29 spaced about its circumference. The leading edge of this carrier recesses 29 is closer to the central shaft 12 then the trailing edge. The trailing edge of a carrier recess 29 is by means of a spirally shaped circumferential section connected with the leading edge of a next carrier recess 29. As a result, the rearmost limiting edge of a carrier recess 29 can engage a suspension shackle 4 of an object to be transferred. As a result of this the objects to be transferred also are moved in the circumferential direction of the apparatus not only by the carrying means 25 but also by carrier recesses 29 of the carrier wheel 18.

Aside of the carrier wheel 18 a spring loaded pressure plate 30 is provided which guarantees that a suspension shackle 4 received in a carrier recess 29 cannot move out of this carrier recess 29 due to a centrifugal movement of the object.

While the apparatus rotates further about the shaft 12 the slide 20, which lifted the wheel 5 out of the rail 1, is moved upwards further until it reaches the upper position, for example as represented in FIG. 1 at the left hand side. In this position the upper part of the suspension shackle 4 is received in a slot 31 of a receiving means 32. The receiving means 32 constitutes the lowermost end of a suspension element 8 of the suspension conveyor 2. Providing the suspension shackle 4 in this slot 31 occurs because the suspension shackle 4, together with the slide 20, follows a circular trajectory which is substantially tangent to the rectilinear trajectory of the suspension elements 8 near to the apparatus.

After the suspension shackles 4 are provided in the slot 31 the slide 20 moves downwards as a result of a downwards extending section of the curved track 22. The upper section of the suspension shackle 4 then engages a correspondingly shaped section of the receiving means 32 that from this moment on carries the suspension shackle 4. During the further downward movement of the slide 20 the carrying means 25 further disengages the wheel 5. The slide 20 moves downwards that far until it reaches the starting position, which among others is represented in FIG. 3 at the right handed side. The objects which have now been suspended in the suspension element 8 move along with the suspension conveyor 2.

In the close vicinity of the transferring apparatus behind the suspension conveyor 2 a pressure rail 33 is, in a biasing way, mounted to the frame 11. Pressure rail 33 guarantees a stable position of the carrying means 8 and the corresponding receiving means 32 when a suspension shackle 4 is positioned therein. As a result of the biased mounting pressure rail 33, however, has the possibility to move away from the apparatus if necessary.

As noted previously the carrying means 25 are mounted in the corresponding slides 20 in a biasing way about the horizontal shaft 24. If now as a result of an operational mistake an object, for example a suspension shackle 4, is offered to a receiving means 32 in which already a suspension shackle 4 is contained the carrying means 25 will pivot inwardly while, simultaneously, the receiving means 32 pushes the pressure rail 33 outwardly. Thus, the suspension shackle contained in the carrying means 25 and the suspension shackle present in the receiving means 32 can pass each other. During the following downward motion of the slide 20 the lowermost end of the respective carrying means 25 passes through the recess in the carrier wheel 18. As a result, the wheel 5 of the suspension shackle 4 will rest on the carrier wheel 18. Now, at a short distance above the carrier wheel 18, an oblique outwardly extending (not shown) scraper plate is provided so that the suspension shackle 4 can be removed from the carrier wheel 18 through the cooperation between this scraper plate and the wheel 5 before the respective carrying means 25 should again receive a new object at the rail 1.

Pivoting inwardly of a carrying means 25 also occurs if it doesn't carry a suspension shackle; however the receiving means 32 already carries a suspension shackle 4.

In the illustrated embodiment the carrying means 25 normally are situated in an outwardly pivoted position as a result of the spring load. If an object is present in the recess 28 of the rail 1 this will be taken along by the first passing carrying means 25. Determining which carrying means 25 takes along an object then occurs through choosing the moment of activation of the abutment means 26. In this way an object being on hold at the abutment means 26 may be provided in a predetermined receiving means 32 of a carrying element 8 of the suspension conveyor 2 in a controlled way.

Instead of the previously described solution for determining in which receiving means 32 an object should be positioned it is also possible to remove the abutment means 26, so that the respective object always comes to a standstill in the recess 28 of the rail 1. In this embodiment the carrying means 25 are pivoted selectively inwards and outwards about the horizontal shaft 24 through an operating device. A carrying means 25 which passes in its inwardly pivoted position will not engage the object present in the recess 28; only if a carrying means 25 (which is pivoted outwardly) passes, the wheel 5 of the object will be engaged and will be taken along in a way as described previously.

By appropriately adapting the shape of the curved track 22 on the curved cylinder 23 the apparatus can be adapted to several circumstances. It is possible, for example, that it is used to lift objects out of a suspension conveyor and to position them on a conveyor shaped as a rail; removing objects from a first suspension conveyor and positioning them in a second suspension conveyor is also possible.

The invention is not restricted to the embodiment described before, which can be varied widely within the scope of the invention.

I claim:

1. Apparatus for transferring objects from a first moving conveyor to a second moving conveyor spaced from said first conveyor, comprising:
   (a) a rotating carousel disposed in the space between said first and second conveyors with its perimeter moving in a path which is substantially tangent to the paths of movement of each of said first and second conveyors;
   (b) a plurality of selectively activatable transferring means disposed in spaced positions about the perimeter of said carousel;
   (c) means for selectively activating each of said transferring means to selectively transfer said objects from said first conveyor to said carousel and from said carousel to said second conveyor; and (d) at least one of said conveyors comprising a suspension conveyor having a plurality of suspensions shackles removably supported thereon for supporting said objects.

2. Apparatus as set forth in claim 1, wherein said transferring means are movable up and down for lifting said objects out of said first conveyor and lowering said objects onto said second conveyor.

3. Apparatus as set forth in claim 2, wherein said carousel is provided with a central stationary curved track at each of said transferring means are provided with a follower which engages said curved track for moving said transferring means up and down.

4. Apparatus as set forth in claim 1, wherein said transferring means comprises carrying means disposed to engage said objects and to be pivoted in and out in a radial direction of said carousel.

5. Apparatus as set forth in claim 4, wherein said carrying means are adapted to be selectively pivoted in and out.

6. Apparatus as set forth in claim 2, wherein said transferring means are mounted up on slides disposed for up and down movement along guide bars supported by said carousel.

7. Apparatus as set forth in claim 1, wherein said carousel is driven by one of said conveyors.

8. Apparatus as set forth in claim 1, wherein at least one of said conveyors comprises a rail and said objects are supported up on shackles having a wheel which rolls along said rail.

9. Apparatus as set forth in claim 8, wherein means are provided adjacent to said rail for selectively activating abutment means for temporarily restraining said objects from engagement with said transferring means.

10. Apparatus for transferring objects carried by a first moving conveyor on a first horizontal plane to a second moving conveyor on a second horizontal plane spaced from said first horizontal plane, comprising:

(a) a rotating carousel disposed in the space between said first and second conveyors with its perimeter moving in a path which is substantially tangent to the paths of movement of each of said first and second conveyors;

(b) a plurality of selectively activatable transferring means disposed in spaced positions about the perimeter of said carousel;

(c) means for selectively activating each of said transferring means to selectively transfer said objects from said first conveyor to said carousel and from said carousel to said second conveyor; and (d) at least one of said conveyors comprises a suspension conveyor having a plurality of suspension shackles removably supported thereon for supporting said objects.

11. Apparatus as set forth in claim 10, wherein said transferring means are movable up and down for lifting said objects out of said first conveyor and lowering said objects onto said second conveyor.

12. Apparatus as set forth in claim 11, wherein said carousel is provided with a central stationary curved track at each of said transferring means are provided with a follower which engages said curved track for moving said transferring means up and down.

13. Apparatus as set forth in claim 10, wherein said transferring means comprises carrying means disposed to engage said objects and to be pivoted in and out in a radial direction of said carousel.

14. Apparatus as set forth in claim 13, wherein said carrying means are spring loaded towards said out position.

15. Apparatus as set forth in claim 13, wherein said carrying means are adapted to be selectively pivoted in and out.

16. Apparatus as set forth in claim 10, wherein said transferring means are mounted up on slides disposed for up and down movement along guide bars supported by said carousel.

17. Apparatus as set forth in claim 10, wherein said carousel is driven by one of said conveyors.

18. Apparatus for transferring objects from a first moving conveyor to a second moving conveyor spaced from said first conveyor, comprising:

(a) a rotating carousel disposed in the space between said first and second conveyors with its perimeter moving in a path which is substantially tangent to the paths of movement of each of said first and second conveyors;

(b) a plurality of selectively activatable transferring means disposed in spaced positions about the perimeter of said carousel;

(c) means for selectively activating each of said transferring means to selectively transfer said objects from said first conveyor to said carousel and from said carousel to said second conveyor; and (d) said transferring means comprises carrying means disposed to engage said objects and to be pivoted in and out in a radial direction of said carousel, and wherein said carrying means are spring loaded towards said out position.

* * * * *